US012732309B2

(12) United States Patent
Navrátil et al.

(10) Patent No.: US 12,732,309 B2
(45) Date of Patent: Sep. 8, 2026

(54) EFFICIENT UPLINK HYBRID AUTOMATIC REPEAT REQUEST FEEDBACK FOR POINT TO MULTIPOINT TRANSMISSIONS

(71) Applicant: Nokia Technologies Oy, Espoo (FI)

(72) Inventors: David Navrátil, Helsinki (FI); David Bhatoolaul, Swindon (GB); Rapeepat Ratasuk, Inverness, IL (US); Fasil Berhanu Tesema, Munich (DE); Volker Pauli, Ansbach (DE)

(73) Assignee: Nokia Technologies Oy, Espoo (FI)

(*) Notice: Subject to any disclaimer, the term of this patent is extended or adjusted under 35 U.S.C. 154(b) by 540 days.

(21) Appl. No.: 17/997,719

(22) PCT Filed: May 18, 2020

(86) PCT No.: PCT/US2020/033465
§ 371 (c)(1),
(2) Date: Nov. 1, 2022

(87) PCT Pub. No.: WO2021/236055
PCT Pub. Date: Nov. 25, 2021

(65) Prior Publication Data
US 2023/0179343 A1 Jun. 8, 2023

(51) Int. Cl.
*H04L 1/1812* (2023.01)
*H04L 1/1829* (2023.01)
(Continued)

(52) U.S. Cl.
CPC .......... *H04L 1/1854* (2013.01); *H04L 1/1812* (2013.01); *H04L 1/1896* (2013.01); *H04W 24/02* (2013.01)

(58) Field of Classification Search
CPC ... H04L 1/1854; H04L 1/1812; H04L 1/1896; H04L 2001/0093; H04W 24/02
See application file for complete search history.

(56) References Cited

U.S. PATENT DOCUMENTS 8,687,607 B2 * 4/2014 Casaccia .............. H04L 1/1671 370/347
9,001,777 B2 * 4/2015 Zhang .................. H04L 5/0094 370/464
(Continued)

FOREIGN PATENT DOCUMENTS

WO 2019/099670 A1 5/2019
WO 2020/068973 A1 4/2020
WO 2021/087855 A1 5/2021

OTHER PUBLICATIONS

"New Work Item on NR support of Multicast and Broadcast Services", 3GPP TSG RAN Meeting #86, RP-193248, Agenda: 9.1.2, Huawei, Dec. 9-12, 2019, 5 pages.
(Continued)

*Primary Examiner* — Michael Thier
(74) *Attorney, Agent, or Firm* — Barta Jones, PLLC

(57) ABSTRACT

An apparatus including at least one processor and at least one memory including computer program code. The at least one memory and the computer program code are configured to, with the at least one processor, cause the apparatus at least to identify at least one of a plurality of user equipment based on a pre-determined channel quality. A determination is made that point-to-point efficiency is greater than point-to-multipoint efficiency. At least one identified UE with worse channel condition is switched from point-to-multi-point to point-to-point.

10 Claims, 14 Drawing Sheets

(51) Int. Cl.

| | |
|---|---|
| ***H04L 1/1867*** | (2023.01) |
| ***H04W 24/02*** | (2009.01) |

(56) References Cited

U.S. PATENT DOCUMENTS

| | | | |
|---|---|---|---|
| 9,820,259 B2 * | 11/2017 | Wang | H04L 12/189 |
| 12,316,459 B2 * | 5/2025 | Ijaz | H04L 1/1864 |
| 2007/0189207 A1 | 8/2007 | Sammour et al. | |
| 2008/0256409 A1 | 10/2008 | Oran et al. | |
| 2013/0315124 A1 | 11/2013 | Rapaport et al. | |
| 2019/0007170 A1 * | 1/2019 | Sun | H04L 1/0072 |
| 2019/0103947 A1 | 4/2019 | Park | |
| 2019/0222967 A1 | 7/2019 | Ratilainen et al. | |
| 2020/0059327 A1 | 2/2020 | Kini et al. | |
| 2020/0099476 A1 | 3/2020 | Park | |
| 2020/0314027 A1 * | 10/2020 | Deschenes | H04N 7/15 |
| 2021/0028890 A1 * | 1/2021 | Rico Alvarino | H04L 27/2613 |
| 2021/0068003 A1 * | 3/2021 | Kadiri | H04L 1/1812 |
| 2021/0282115 A1 * | 9/2021 | Sengupta | H04W 72/046 |
| 2022/0217506 A1 * | 7/2022 | Xu | H04W 74/0833 |
| 2023/0007444 A1 * | 1/2023 | Byun | H04W 76/10 |
| 2023/0388755 A1 * | 11/2023 | Ganesan | H04L 1/1671 |
| 2025/0373888 A1 * | 12/2025 | Wang | H04N 21/43615 |

OTHER PUBLICATIONS

"3rd Generation Partnership Project; Technical Specification Group Radio Access Network; Evolved Universal Terrestrial Radio Access (E-UTRA); Study on single-cell point-to-multipoint transmission for E-UTRA (Release 13)", 3GPP TR 36.890, V13.0.0, Jun. 2015, pp. 1-31.

"3rd Generation Partnership Project; Technical Specification Group Radio Access Network; NR; Physical layer procedures for control (Release 16)", 3GPP TS 38.213, V16.0.0, Dec. 2019, pp. 1-146.

"3rd Generation Partnership Project; Technical Specification Group Radio Access Network; Study on RAN-centric data collection and utilization for LTE and NR (Release 16)", 3GPP TR 37.816, V16.0.0, Jul. 2019, pp. 1-35.

"IEEE 802.3", Wikipedia, Retrieved on Nov. 16, 2022, Webpage available at : https://en.wikipedia.org/wiki/IEEE_802.3.

"3rd Generation Partnership Project; Technical Specification Group Services and System Aspects; System architecture for the 5G System (5GS); Stage 2 (Release 16)", 3GPP TS 23.501, V16.4.0, Mar. 2020, pp. 1-430.

Yu Lien et al., "3GPP NR Sidelink Transmissions Toward 5G V2X", IEEE Access, vol. 8, Feb. 13, 2020, pp. 35368-35382.

International Search Report and Written Opinion received for corresponding Patent Cooperation Treaty Application No. PCT/US2020/033465, dated Mar. 30, 2021, 19 pages.

"GCSE TR 23.768 current solutions evaluations and near term goals", SA WG2 Meeting #98, S2-132689, Agenda: 6.5, Nokia Siemens Networks, Jul. 15-19, 2013, pp. 1-6.

Office action received for corresponding European Patent Application No. 20731673.8, dated Feb. 14, 2025, 7 pages.

* cited by examiner

EFFICIENT UPLINK HYBRID AUTOMATIC REPEAT REQUEST FEEDBACK FOR POINT TO MULTIPOINT TRANSMISSIONS

RELATED APPLICATION

This application was originally filed as PCT Application No. PCT/US2020/033465, filed on May 18, 2020, which is incorporated herein by reference in its entirety.

FIELD

Some example embodiments may generally relate to mobile or wireless telecommunication systems, such as Long Term Evolution (LTE), fifth generation (5G) radio access technology (RAT), new radio (NR) access technology, or other communications systems. For example, certain embodiments may relate to systems and/or methods for optimizing aggregated feedback frequencies.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is expected that NR can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). The next generation radio access network (NG-RAN) represents the RAN for 5G, which can provide both NR and LTE (and LTE-Advanced) radio accesses. It is noted that, in 5G, the nodes that provide radio access functionality to a user equipment (i.e., similar to the Node B in UTRAN or the evolved Node B (eNB) in LTE) may be named next-generation Node B (gNB) when built on NR radio and may be named next-generation eNB (NG-eNB) when built on E-UTRA radio.

SUMMARY

In accordance with some embodiments, a method may include identifying, by a network entity, at least one of a plurality of user equipment based on a pre-determined channel quality. The method may further include determining, by the network entity, that point-to-point efficiency is greater than point-to-multipoint efficiency. The method may further include switching, by the network entity, at least one identified user equipment with worse channel condition from point-to-multipoint to point-to-point.

In accordance with certain embodiments, an apparatus may include means for identifying at least one of a plurality of user equipment based on a pre-determined channel quality. The apparatus may further include means for determining that point-to-point efficiency is greater than point-to-multipoint efficiency. The apparatus may further include means for switching at least one identified user equipment with worse channel condition from point-to-multipoint to point-to-point.

In accordance with various embodiments, an apparatus may include at least one processor and at least one memory including computer program code. The at least one memory and the computer program code can be configured to, with the at least one processor, cause the apparatus to at least identify at least one of a plurality of user equipment based on a pre-determined channel quality. The at least one memory and the computer program code can be further configured to, with the at least one processor, cause the apparatus to at least determine that point-to-point efficiency is greater than point-to-multipoint efficiency. The at least one memory and the computer program code can be further configured to, with the at least one processor, cause the apparatus to at least switch at least one identified user equipment with worse channel condition from point-to-multipoint to point-to-point.

In accordance with some embodiments, a non-transitory computer readable medium can be encoded with instructions that may, when executed in hardware, perform a method. The method may include identifying at least one of a plurality of user equipment based on a pre-determined channel quality. The method may further include determining that point-to-point efficiency is greater than point-to-multipoint efficiency. The method may further include switching at least one identified user equipment with worse channel condition from point-to-multipoint to point-to-point.

In accordance with certain embodiments, a computer program product may perform a method. The method may include identifying at least one of a plurality of user equipment based on a pre-determined channel quality. The method may further include determining that point-to-point efficiency is greater than point-to-multipoint efficiency. The method may further include switching at least one identified user equipment with worse channel condition from point-to-multipoint to point-to-point.

In accordance with various embodiments, an apparatus may include circuitry configured to identify at least one of a plurality of user equipment based on a pre-determined channel quality. The circuitry may further be configured to determine that point-to-point efficiency is greater than point-to-multipoint efficiency. The circuitry may further be configured to switch at least one identified user equipment with worse channel condition from point-to-multipoint to point-to-point.

In accordance with some embodiments, a method may include determining, by a network entity, at least one aggregated feedback timing for at least one single cell point-to-multipoint bearer. The method may further include transmitting, by the network entity, at least one notification to at least one user equipment with the determined aggregated feedback timing. The method may further include switching, by the network entity, at least one identified user equipment with worse channel condition from point-to-multipoint to point-to-point.

In accordance with certain embodiments, an apparatus may include means for determining at least one aggregated feedback timing for at least one single cell point-to-multipoint bearer. The apparatus may further include means for transmitting at least one notification to at least one user equipment with the determined aggregated feedback timing. The apparatus may further include means for receiving aggregated feedback comprising at least one of hybrid automatic repeat request acknowledgement/negative acknowledgement from at least one user equipment receiving the single cell point to multipoint bearer.

In accordance with various embodiments, an apparatus may include at least one processor and at least one memory including computer program code. The at least one memory and the computer program code can be configured to, with the at least one processor, cause the apparatus to at least determine at least one aggregated feedback timing for at least one single cell point-to-multipoint bearer. The at least one memory and the computer program code can be further configured to, with the at least one processor, cause the apparatus to at least transmit at least one notification to at least one user equipment with the determined aggregated feedback timing. The at least one memory and the computer program code can be further configured to, with the at least one processor, cause the apparatus to at least receive aggregated feedback comprising at least one of hybrid automatic repeat request acknowledgement/negative acknowledgement from at least one user equipment receiving the single cell point to multipoint bearer.

In accordance with some embodiments, a non-transitory computer readable medium can be encoded with instructions that may, when executed in hardware, perform a method. The method may include determining at least one aggregated feedback timing for at least one single cell point-to-multipoint bearer. The method may further include transmitting at least one notification to at least one user equipment with the determined aggregated feedback timing. The method may further include receiving aggregated feedback comprising at least one of hybrid automatic repeat request acknowledgement/negative acknowledgement from at least one user equipment receiving the single cell point to multipoint bearer.

In accordance with certain embodiments, a computer program product may perform a method. The method may include determining at least one aggregated feedback timing for at least one single cell point-to-multipoint bearer. The method may further include transmitting at least one notification to at least one user equipment with the determined aggregated feedback timing. The method may further include receiving aggregated feedback comprising at least one of hybrid automatic repeat request acknowledgement/negative acknowledgement from at least one user equipment receiving the single cell point to multipoint bearer.

In accordance with various embodiments, an apparatus may include circuitry configured to determine at least one aggregated feedback timing for at least one single cell point-to-multipoint bearer. The circuitry may further be configured to transmit at least one notification to at least one user equipment with the determined aggregated feedback timing. The circuitry may further be configured to receive aggregated feedback comprising at least one of hybrid automatic repeat request acknowledgement/negative acknowledgement from at least one user equipment receiving the single cell point to multipoint bearer.

In accordance with some embodiments, a method may include transmitting, by a user equipment, at least one aggregated hybrid automatic repeat request acknowledgement/negative acknowledgement feedback. The method may further include adjusting, by the user equipment, at least one aggregated feedback timing.

In accordance with certain embodiments, an apparatus may include means for transmitting at least one aggregated hybrid automatic repeat request acknowledgement/negative acknowledgement feedback. The apparatus may further include means for adjusting at least one aggregated feedback timing.

In accordance with various embodiments, an apparatus may include at least one processor and at least one memory including computer program code. The at least one memory and the computer program code can be configured to, with the at least one processor, cause the apparatus to at least transmit at least one aggregated hybrid automatic repeat request acknowledgement/negative acknowledgement feedback. The at least one memory and the computer program code can be further configured to, with the at least one processor, cause the apparatus to at least adjust at least one aggregated feedback timing.

In accordance with some embodiments, a non-transitory computer readable medium can be encoded with instructions that may, when executed in hardware, perform a method. The method may include transmitting at least one aggregated hybrid automatic repeat request acknowledgement/negative acknowledgement feedback. The method may further include adjusting at least one aggregated feedback timing.

In accordance with certain embodiments, a computer program product may perform a method. The method may include transmitting at least one aggregated hybrid automatic repeat request acknowledgement/negative acknowledgement feedback. The method may further include adjusting at least one aggregated feedback timing.

In accordance with various embodiments, an apparatus may include circuitry configured to transmit at least one aggregated hybrid automatic repeat request acknowledgement/negative acknowledgement feedback. The circuitry may further be configured to adjust at least one aggregated feedback timing.

BRIEF DESCRIPTION OF THE DRAWINGS

For proper understanding of example embodiments, reference should be made to the accompanying drawings, wherein.

DETAILED DESCRIPTION

Figure 1:
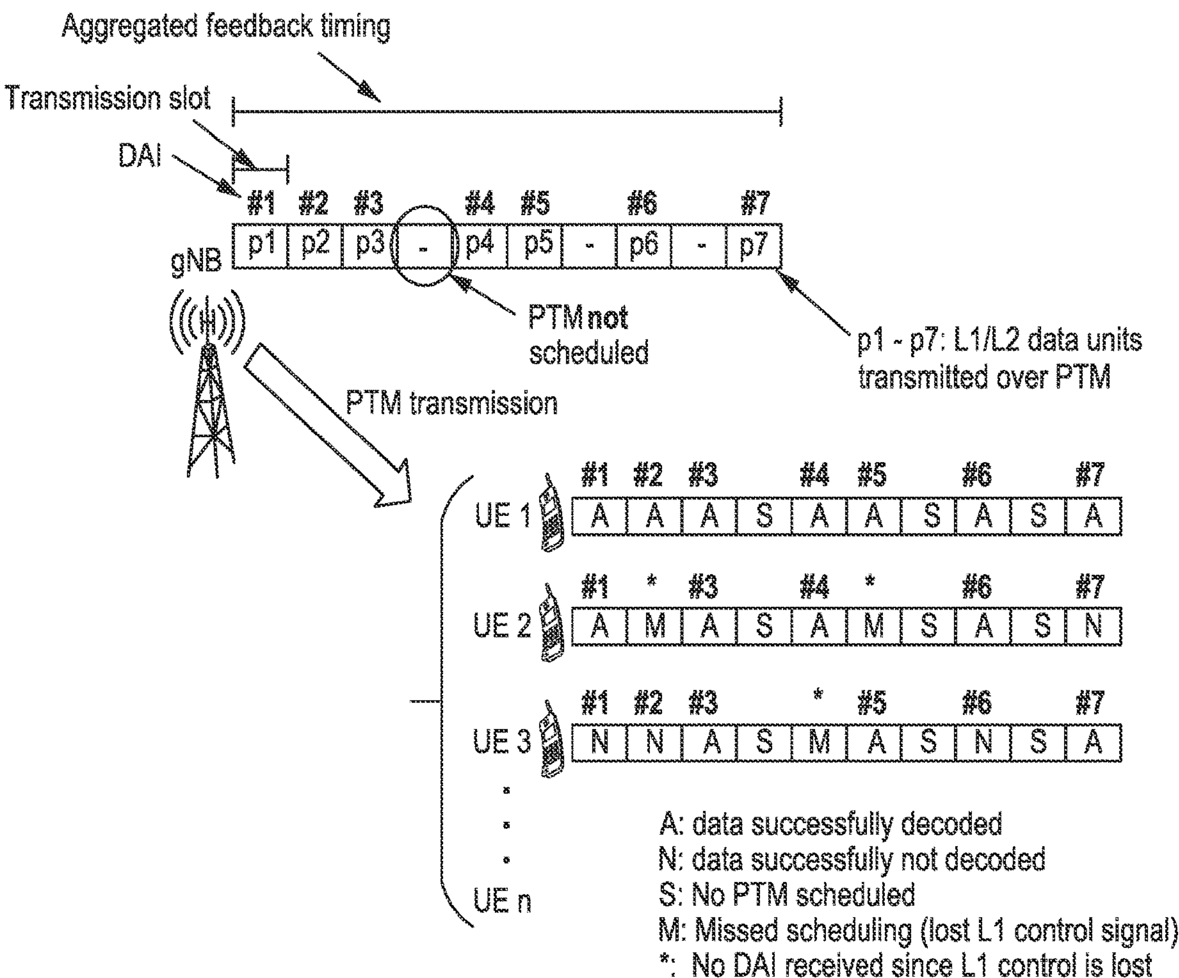
FIG. 1 illustrates an example of data transmission and reception via point to multi-point (PTM) within aggregated feedback timing.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for optimizing aggregated feedback frequencies is not intended to limit the scope of certain embodiments, but is instead representative of selected example embodiments.

Wireless technologies may use retransmission techniques when data is received with errors, improving reliable and accurate delivery of the service. For example, radio link control (RLC) may utilize automatic repeat request (ARQ) procedures, while medium access control (MAC)/physical (PHY) radio sublayers may use hybrid automatic repeat request (HARQ) techniques.

As the number of UE that consume MBS increases, the number of HARQ acknowledgement (ACK)/negative acknowledgement (NACK) feedback also increases, resulting in high signalling overhead and resource inefficiency. Thus, a need exists to support HARQ ACK/NACK feedback from many UEs, but with significantly lower overhead and resource inefficiency.

Enhanced outer loop link adaptation (eOLLA) techniques may modify a modulation and coding scheme (MCS) with conservative settings based on the number of UE, which is an alternative technique for satisfying reliability requirements. However, for the substantially same number of UE where eOLLA does not react, fading and power degradations may randomly cause bursty errors over time, resulting in protocol data unit (PDU) loss. Despite the large number of HARQ ACK/NACK feedback, along with their resulting signalling overhead and resource inefficiency, maintaining an efficient MCS, along with data retransmission via HARQ for lost/decode-fail data units, is needed to desirable the reliability of the link.

UEs may use group-based common link channels to transmit HARQ NACK responses, allowing removal of the signalling and resources needed to transmit HARQ ACKs. However, in situations where UEs lack scheduling information due to a failure in decoding downlink layer 1 (L1) control signals, UEs are unable to recognize the need for sending a NACK response, which the network may identify when an expected ACK response is not received from a UE. Thus, removing ACK responses may hinder recognizing packet loss caused by missed scheduling information. If both ACK and NACK responses are expected on the substantially same group-based uplink channel, ACK and NACK responses received by the network node from multiple different UEs may interfere with each other in a way that leads to misinterpretations of ACK and NACK as being the other. Even a separate group-based common uplink channel for HARQ ACK would not fully resolve the problem due to ambiguity or interference of ACKs received from different UEs.

In LTE and 5G unicast, UEs transmit HARQ ACK/NACK feedback corresponding with one physical downlink shared channel (PDSCH) transmission for transport blocks transmitted over one carrier or spatial stream. However, the signalling of HARQ ACK/NACK feedback for unicast is performed for dedicated link between a UE and network node, in comparison to feedback for PTM, where a large number of UEs provide feedback for one downlink PTM transmission.

HARQ ACK/NACK feedback may be aggregated for, as examples, time division duplex (TDD) by collecting ACK/NACK feedback until the next uplink (UL) slot/subframe for feedback, multiple spatial streams in multiple input multiple output (MIMO) features, multiple carriers in carrier aggregation features, and multiple code block group at the physical layer.

Such aggregation of ACK/NACK feedback in these examples may be referred to as HARQ bundling or HARQ codebooks. However, these techniques do not address aggregating ACK/NACK feedback for PTM based on QoS requirements for MBS. Furthermore, these examples also do not address certain PTM features, such as where aggregated feedback frequency and feedback payload may be optimized for PTM. Certain example embodiments described herein may also address the large number of uplink resources needed by a NE reserved for dedicated ACK/NACK feedback for a high number of UEs where PTM is more efficient than point-to-point (PTP); as a result, the number of reserved uplink resources is proportional to the number of UEs.

FIG. 1 illustrates an example of data transmission and reception via PTM within aggregated feedback timing. In this example, L1/L2 data units, such as 'X=7' (p1, p2, . . . , p7), are transmitted via PTM transmission within the aggregated feedback timing. For transmission slots where PTM is scheduled, the downlink assignment index (DAI) is one of the L1 control fields (i.e., one of the downlink control information (DCI) fields) which notifies the UE about the PTM scheduling assignment. The DAI fields assist the UE to identify missed scheduling due to loss of L1 control signal. For example, UE 2 successfully received L1 control signal with DAI=#1 and lost L1 control signal with DAI=#2. When the UE successfully receives the L1 control signal with DAI=#3, the UE is able to detect any missed scheduling which is lost in previous reception slots. In addition, some UE may successfully receive L1 control signal (scheduling assignment), but the UE may be unable to decode, for example, due to a cyclic redundancy check (CRC) mismatch and/or L1/L2 data loss. Traditional HARQ techniques would generate ACK feedback when the UE successfully decodes received L1/L2 data, while NACK feedback would be generated instead when the UE fails to decode L1/L2 data and/or detects that it has missed scheduling in a previous scheduling slot. Thus, no feedback would be generated for reception slots where PTM is unscheduled and/or the scheduling assignment is not detected.

Figure 2:
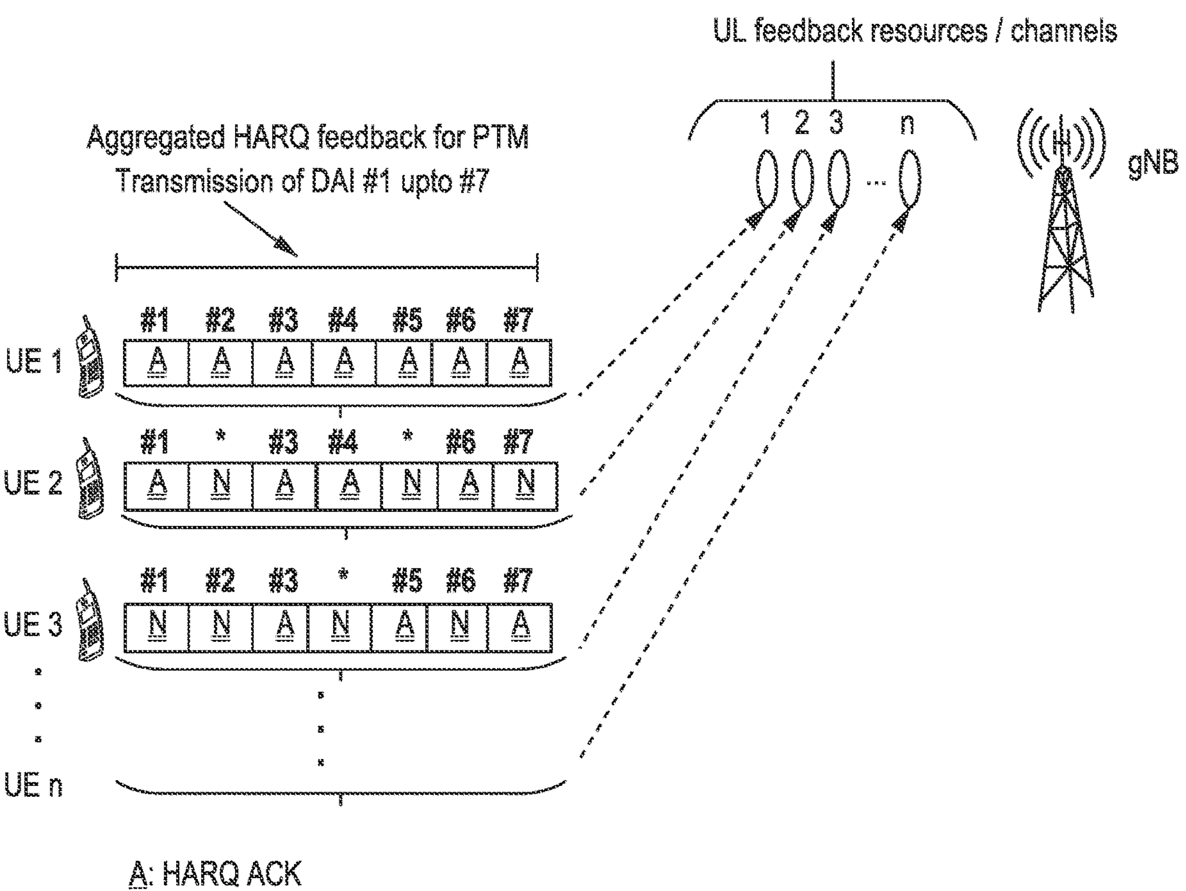
FIG. 2 illustrates an example of aggregated feedback for PTM transmission without feedback payload optimization.

FIG. 2 illustrates an example of aggregated feedback for PTM transmission without feedback payload optimization. In this example, bit ACK (A) may be used for PTM reception slots that are successfully decoded, while bit NACK (N) may be used for PTM reception slots that are not successfully decoded or detected as a missed scheduling, which are indicated with '*'. In order to avoid uplink interference between feedback received from different UE, the aggregated ACK/NACK feedback may be delivered to the network via uplink orthogonal time-frequency resources at the network. For example, the aggregated ACK/NACK feedback may be transmitted via a UE-specific dedicated uplink channel, or a common uplink channel (e.g., common PUCCH) by using time division multiple access for the MBS-consuming UEs. With this technique, the frequency of conventional HARQ/ACK feedback may be drastically reduced while using an equivalent ACK/NACK payload with the aggregated feedback timing.

Figure 3:
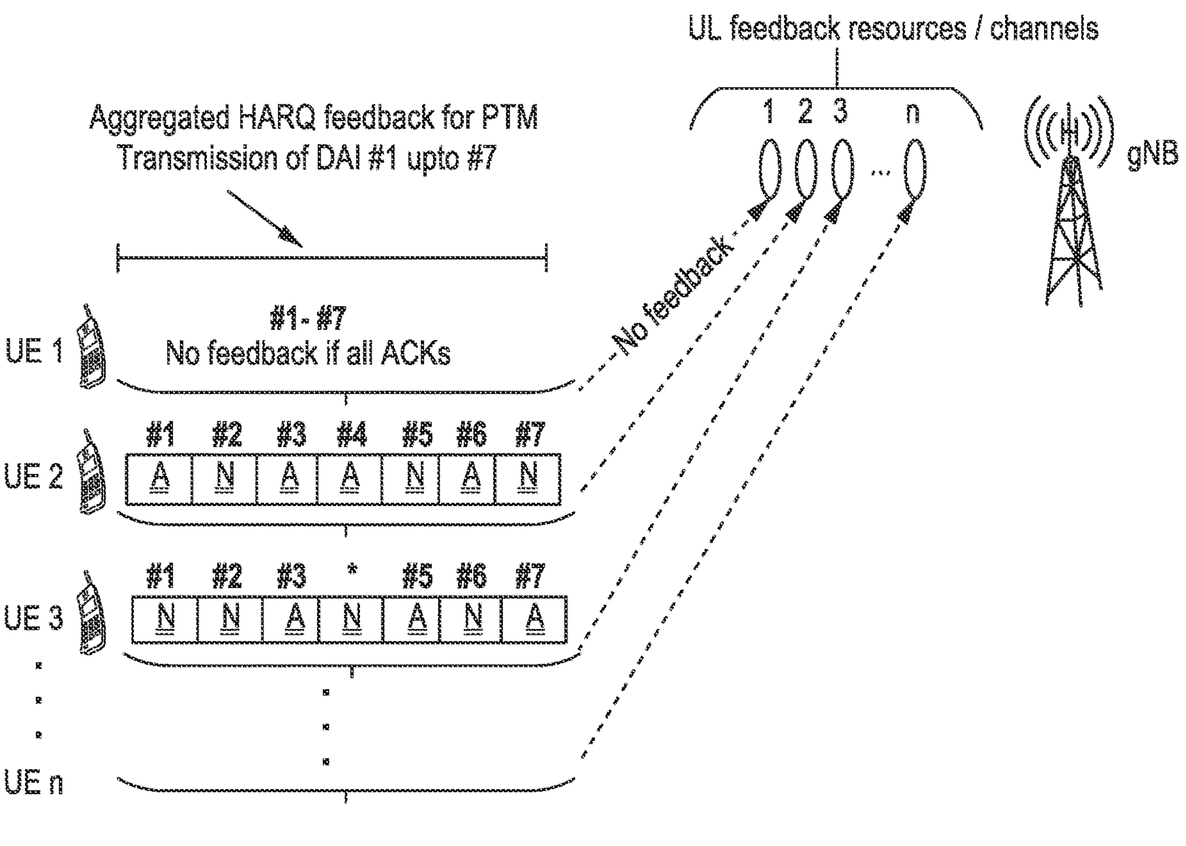
FIG. 3 illustrates an example of aggregated feedback for PTM transmission with feedback payload optimization for highly reliable physical uplink control channel (PUCCH) according to certain embodiments.

In FIG. 3, aggregated feedback for PTM transmission is shown with feedback payload optimization for highly reliable PUCCH. Here, if the receptions are ACK within the aggregated feedback timing, the UE would not send feedback (zero feedback payload), which may improve bit optimization. Thus, when no feedback is received at the network element (NE), the NE inherently interprets ACK for some or all reception within the aggregated feedback timing. Conversely, if there is at least one NACK generated within the aggregated feedback timing at the UE, the UE may send the entire aggregated feedback to the NE. Thus, the network may identify PTM transmission slots with NACK and perform re-transmissions, accordingly. This may lead to a reduction in the frequency of conventional HARQ/ACK feedback, and the overall ACK/NACK payload within aggregated feedback timing is optimized for UEs that have successful reception. However, this approach is unsuitable for unreliable PUCCH where aggregated feedback with NACK elements may not be received by the NE successfully. The NE may not be able to reliably detect whether the UE transmitted any feedback and, thus, interpret the loss of feedback as ACK, leading to no retransmission. In addition, the NE may be able to detect that the UE transmitted a feedback, such as by detecting a signal energy, but it may not able to decode the aggregated feedback. In such cases, the NE should assume some or all NACKs leading to extensive retransmission of some or all transmitted data during the aggregated feedback timing period.

Figure 4:
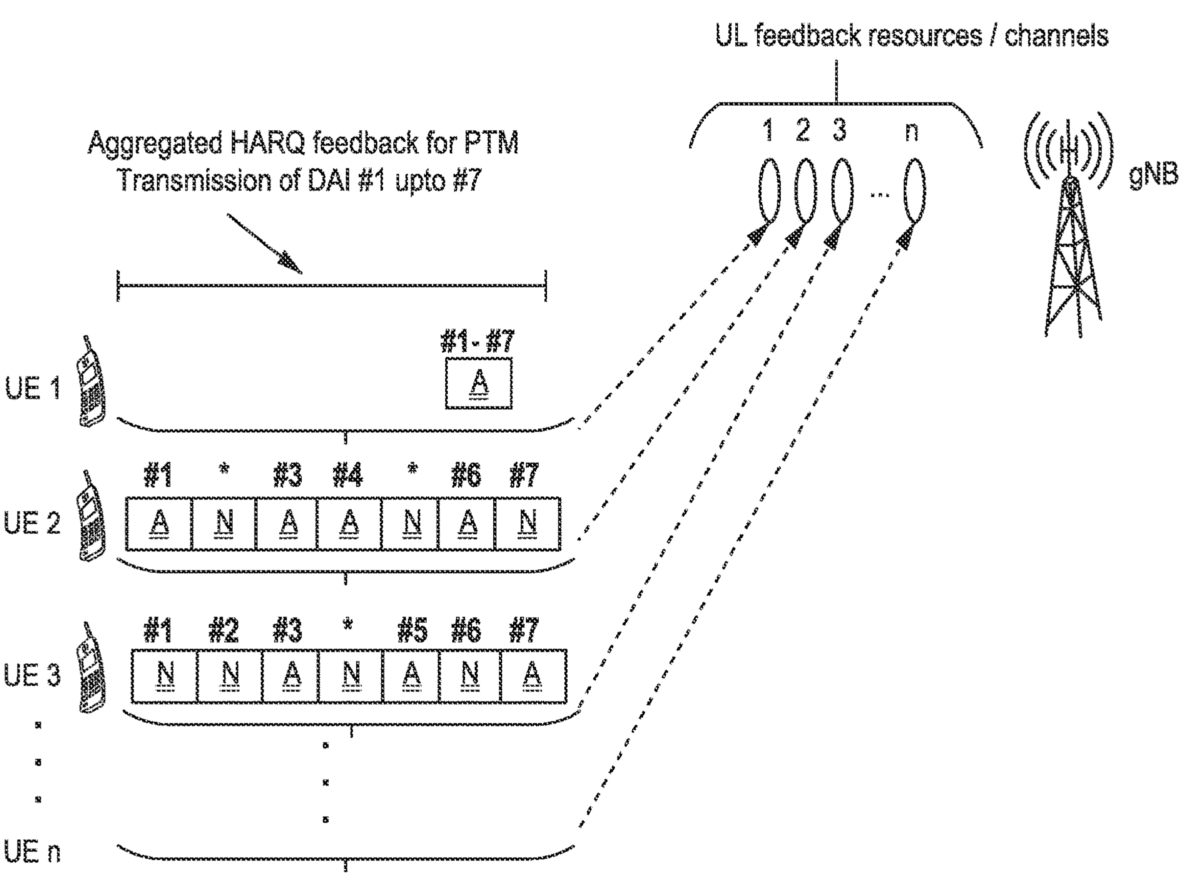
FIG. 4 illustrates an example of aggregated feedback for PTM transmission along-with feedback payload optimization for less reliable PUCCH according to certain embodiments.

FIG. 4 illustrates an example of aggregated feedback for PTM transmission with feedback payload optimization for less reliable PUCCH. Here, if the receptions are acknowledged within the aggregated feedback timing, the UE may allocate a 1-bit ACK feedback representing the reception in multiple slots, leading to optimization of the feedback payload. With this approach, the frequency of conventional HARQ/ACK feedback may be reduced, and the overall ACK/NACK payload within aggregated feedback timing may be optimized for UEs that have successful reception. Furthermore, this technique may avoid the risks described above related to unreliable PUCCH since the network would not interpret the loss of feedback as acknowledged.

Figure 5:
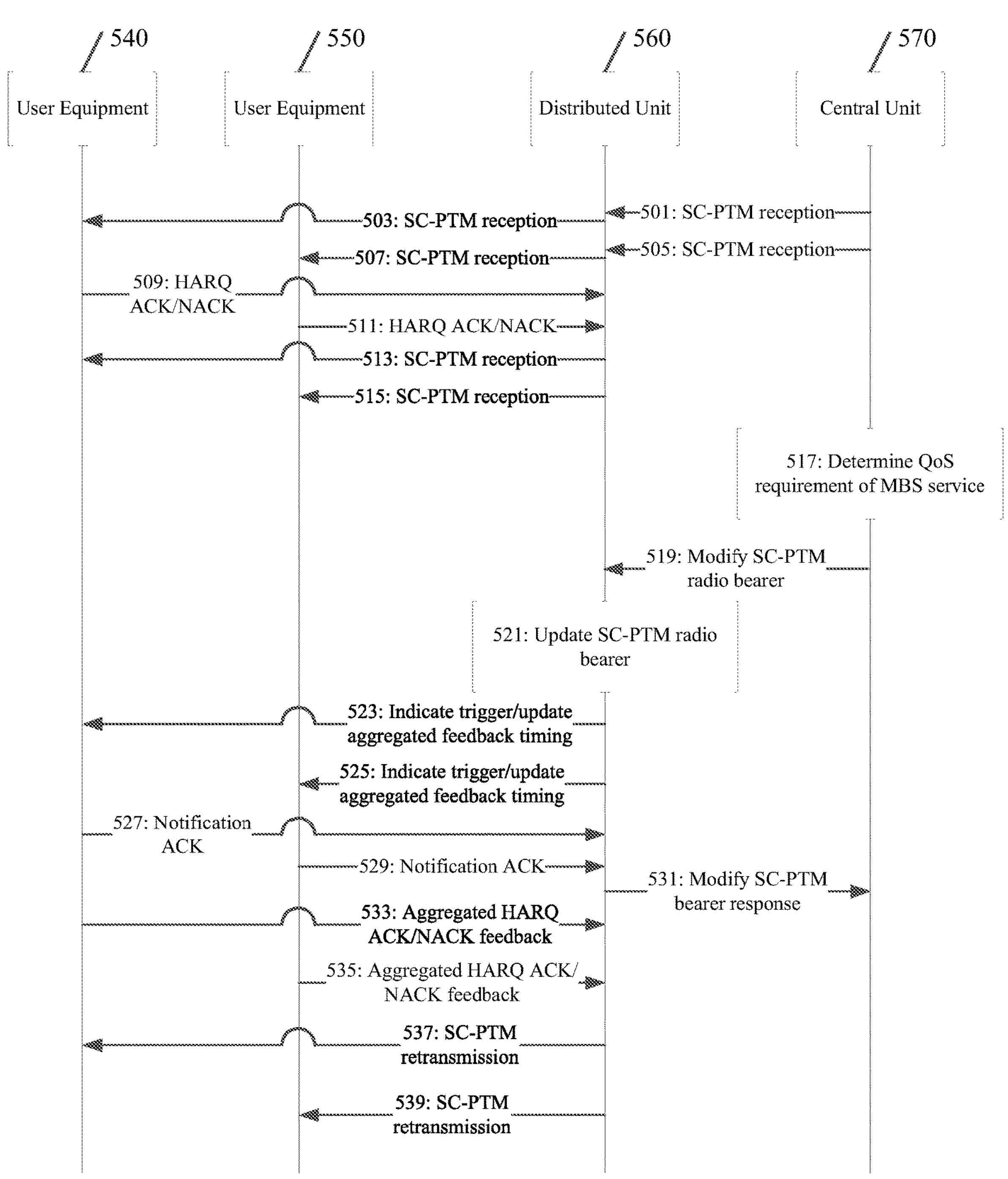
FIG. 5 illustrates an example of a signaling diagram for aggregated feedback timing configuration based on quality of service (QoS) requirement of the multicast and broadcast systems (MBS) service according to certain embodiments.
Figure 13:
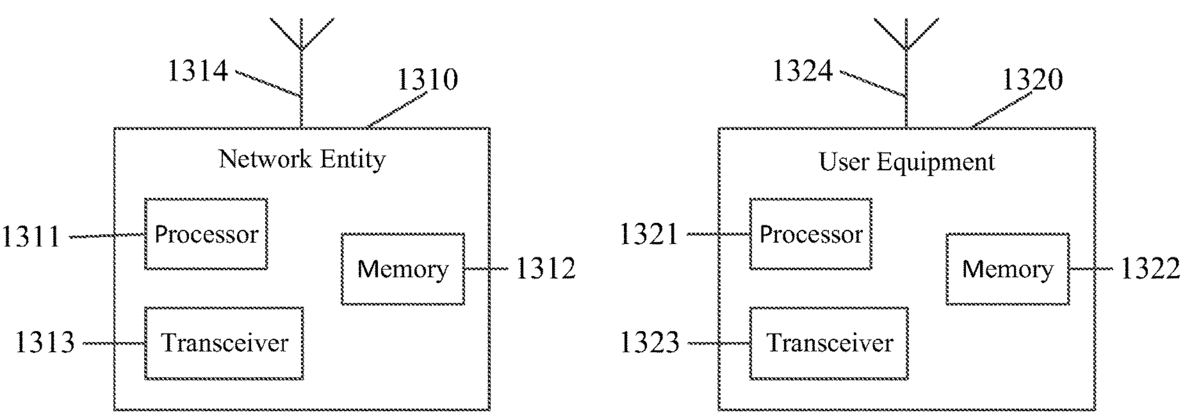
FIG. 13 illustrates an example of various network devices according to certain embodiments.

FIG. 5 illustrates an example of a signaling diagram depicting how to handle aggregated feedback with extensive NACKs in coordination with PTM to PTP switching functions between UE 540, UE 550, NE-DU 560, and NE-CU 570, according to one embodiment. UE 540 and UE 550 may be similar to UE 1320, and NE-DU 560 and NE-CU 570 may be similar to NE 1310, as illustrated in FIG. 13, according to certain embodiments. As shown at 501-515, UE 540 and UE 550 may receive SC-PTM bearers where conventional HARQ ACK/NACK feedbacks are generated to assist NE-DU 560 to perform retransmission over the SC-PTM bearer. Then, at 517, when NE-DU 560 monitors QoS requirements of at least one MBS service that is delay-tolerant, NE-CU 570 may activate aggregated feedback at 517. Then at 519, NE-CU 570 may transmit to NE-DU 560 at least one SC-PTM bearer modification message, as well as at least one recommended aggregated feedback timing. At 521, NE-DU 560 may update at least one SC-PTM radio bearer with the recommended aggregated feedback timing. Additionally or alternatively, NE-CU 570 may transmit to NE-DU 560 at least one value of the QoS delay budget requirement of the service in the SC-PTM bearer modification message, followed by NE-DU 560 determining at least one corresponding configuration for the aggregated feedback timing.

NE-DU 560 may transmit, as shown at 523 and 525, to MBS-consuming UE 540 and UE 550 at least one notification indicating the triggered/updated aggregated feedback timing. In response, MBS-consuming UE 540 and UE 550 may transmit at least one acknowledgement to NE-DU 560, shown at 527 and 529. At 531, NE-DU 560 may transmit to NE-CU 570 at least one response to the at least one SC-PTM bearer modification message.

MBS-consuming UE 540 and UE 550 may, as shown at 533 and 535, transmit at least one aggregated HARQ ACK/NACK based on the new configuration received at 523 and 525, respectively. Meanwhile, at 537 and 539, NE-DU 560 may perform at least one retransmission for NACKs within the aggregated feedback timing. It is noted that, while network operators may use various implementations, the network may still notify MBS-consuming UE 540 and UE 550 about aggregated feedback timing via RRC reconfiguration messages, MAC control elements, and/or physical layer control information, such as DCI.

Figure 6:
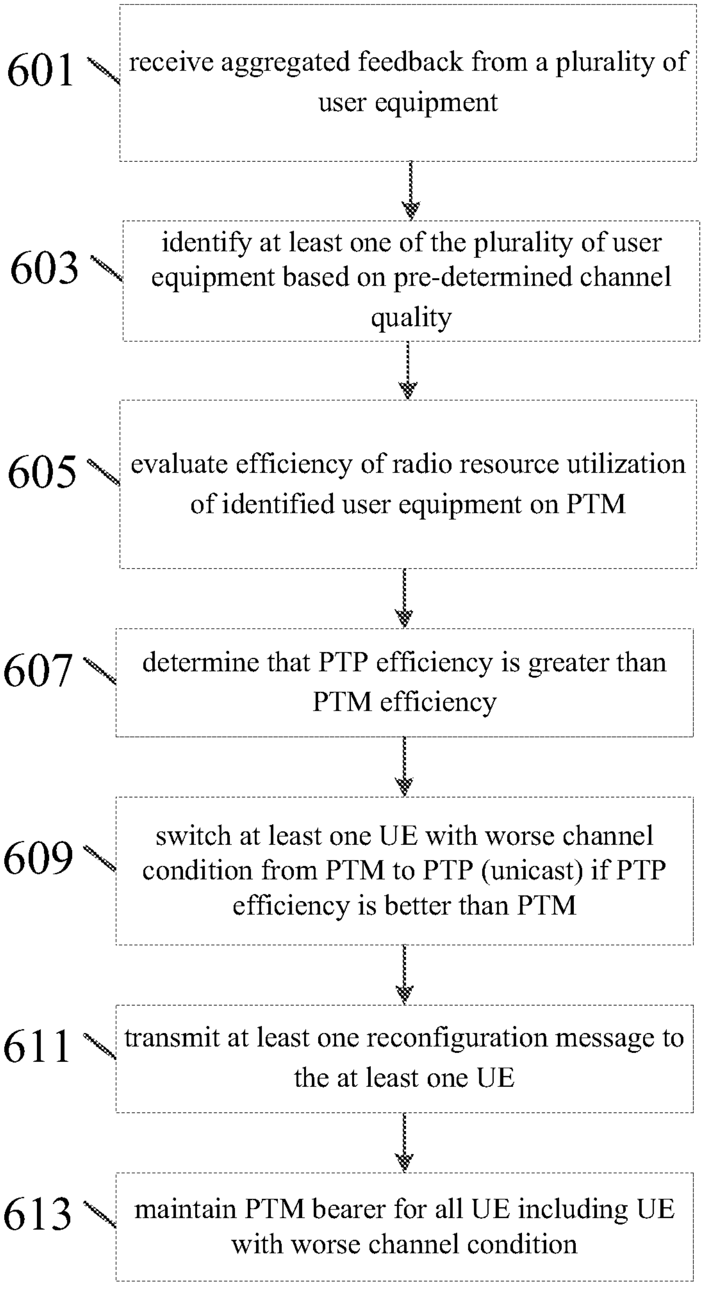
FIG. 6 illustrates an example of a flow diagram of a method that may be performed by a network entity (NE) according to certain embodiments.

FIG. 6 illustrates an example of a flow diagram of a method that may be performed by a NE, such as NE 1310 illustrated in FIG. 13, according to certain embodiments. In particular, FIG. 6 depicts processing aggregated feedback with extensive NACKs in coordination with PTM-to-PTP switching functions. At 601, the NE may receive aggregated feedback from one or a plurality of UE, at least one of which may be similar to UE 1320 shown in FIG. 13. Additionally or alternatively, the NE may receive at least one extensive NACK in an aggregated feedback from the at least one UE in worse channel condition. At 603, the NE may identify at least one of the plurality of UE with a worse channel, for example, which falls below a pre-determined channel quality threshold. In some embodiments, a "worse channel" UE may be a UE which generates extensive HARQ NACK that could potentially violate at least one QoS delay budget requirement of the service with heavy re-transmission. Thus, the NE may identify a worse channel UE based on an estimated number of violations of the at least one QoS delay budget requirement by re-transmission needed for extensive received NACKs from the UE. This identified UE may be associated with extensive NACKs. In various embodiments, HARQ NACK may be extensive when at least one threshold, such as at least one QoS delay budget requirement, is exceeded. For example, the NE may estimate the potential delay incurred on the service for re-transmission. If the estimated delay violates the threshold, the NE may compare estimates of PTP and PTM spectral efficiencies for the UE with the largest NACK feedback. In response, if PTP spectral efficiency is higher than PTM spectral efficiency, the NE may switch the UE to PTP. Alternatively, the NE may adjust the aggregate feedback timing to accommodate the QoS delay budget requirement.

At 605, the NE may evaluate the efficiency of radio resource utilization of the identified at least one of the UE on PTM, and may estimate the efficiency on potential PTP. At 607, the NE may determine that PTP efficiency is greater than PTM efficiency, followed by the NE switching at least one of the identified UE from PTM to PTP if PTP efficiency is better than PTM at 609, which may be associated with unicast. At 611, the NE may transmit at least one reconfiguration message to the at least one identified UE. In some embodiments, the at least one reconfiguration message may include at least one update on the new PTP radio bearer. Finally, at 613, the NE may maintain PTM bearers for some or all UE, including those identified UE.

Figure 7:
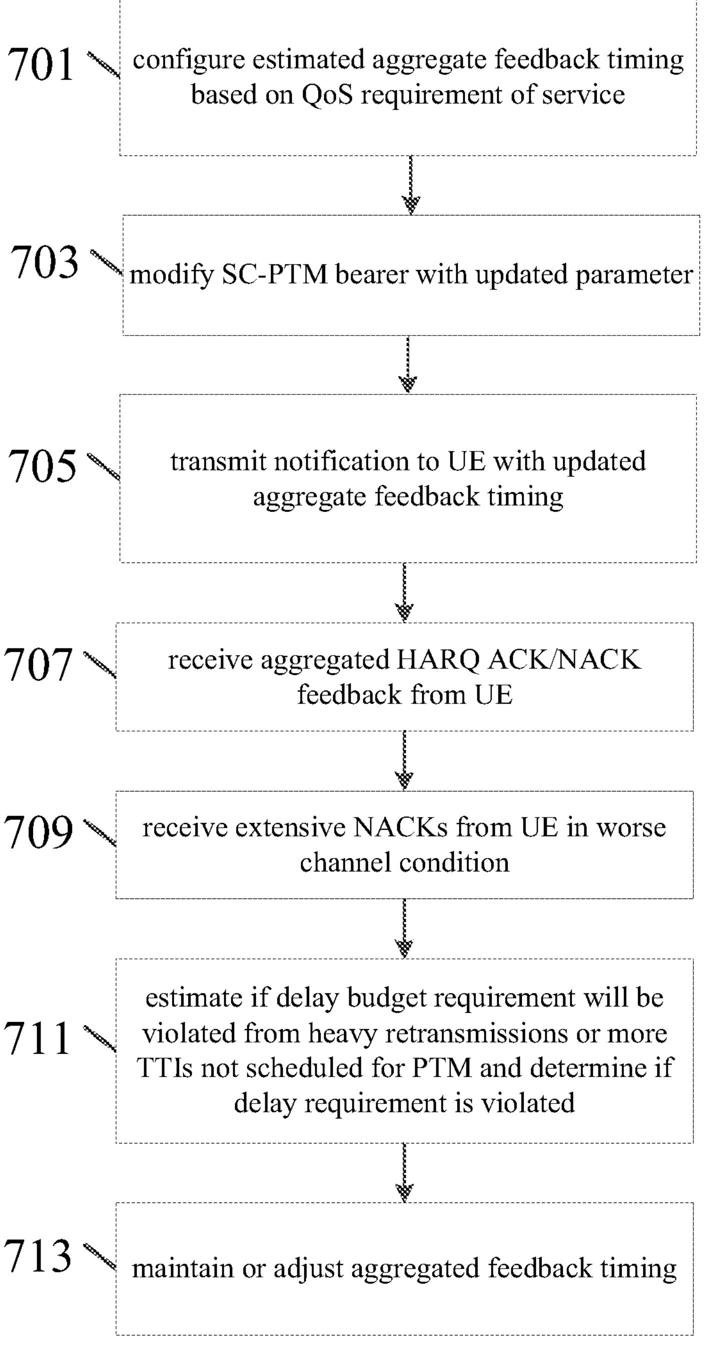
FIG. 7 illustrates an example of a flow diagram of a method according to various embodiments.

FIG. 7 illustrates an example of a flow diagram of another method that may be performed by a NE, such as NE 1310 illustrated in FIG. 13, according to certain embodiments. In particular, FIG. 7 illustrates dynamic adjustment of aggregated feedback timing when extensive NACKs are received from UEs, which could compromise the delay budget requirement of the service. At 701, the NE may configure estimated aggregated feedback timing based on QoS requirement of service, and may determine at least one aggregated feedback timing for at least one SC-PTM bearer. In some embodiments, the determination may be based on one or more of quality of service requirement, delay budget, received HARQ ACK/NACK, capacity of feedback channel, and scheduling of SC-PTM. At 703, the NE may modify at least one SC-PTM bearer with at least one updated parameter, for example, updated aggregated feedback timing.

Then, at 705, the NE may transmit at least one notification to at least one UE including the updated aggregated feedback timing, while at 707, the NE may begin receiving aggregated HARQ ACK/NACK feedback from the at least one UE. At 709, upon receiving the aggregated HARQ ACK/NACK feedback, the NE may then receive at least one extensive NACK from the at least one UE in worse channel condition. In some embodiments, a "worse channel" UE may be a UE which generates extensive HARQ NACK that could potentially violate at least one QoS delay budget requirement of the service with heavy re-transmission. Thus, the NE may identify a worse channel UE based on an estimated number of violations of the at least one QoS delay budget requirement by re-transmission needed for extensive received NACKs from the UE. In various embodiments, HARQ NACK may be extensive when at least one threshold, such as at least one QoS delay budget requirement, is exceeded. For example, the NE may estimate the potential delay incurred on the service for re-transmission. If the estimated delay violates the threshold, the NE may compare estimates of PTP and PTM spectral efficiencies for the UE with the largest NACK feedback. In response, if PTP spectral efficiency is higher than PTM spectral efficiency, the NE may switch the UE to PTP. Alternatively, the NE may adjust the aggregate feedback timing to accommodate the QoS delay budget requirement. At 711, the NE may estimate whether at least one delay budget requirement will be violated due to heavy retransmissions and/or transmission time intervals (TTI) not scheduled for PTM and determine if any delay requirement is violated. At 713, the NE may determine that at least one delay budget requirement will be violated, and then at 715, the NE may maintain or adjust aggregated feedback timing.

Figure 8:
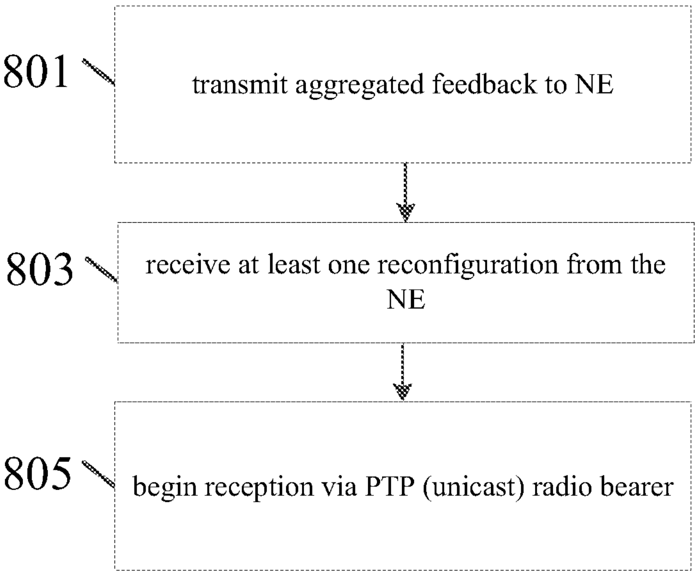
FIG. 8 illustrates an example of a flow diagram of a method according to some embodiments.

FIG. 8 illustrates an example of a flow diagram of a method that may be performed by a UE, such as UE 1320 illustrated in FIG. 13, according to certain embodiments. Similar to FIG. 5, FIG. 7 depicts processing aggregated feedback with extensive NACKs in coordination with PTM-to-PTP switching functions from the perspective of the UE. At 801, the UE may transmit aggregated feedback to at least one NE, which may be similar to NE 1310 illustrated in FIG. 13. At 803, the UE may receive at least one reconfiguration message from the NE. In some embodiments, the at least one reconfiguration message may include at least one update of a new PTP radio bearer. And at 805, the at least one UE may begin reception via at least one PTP (unicast) radio bearer.

Figure 9:
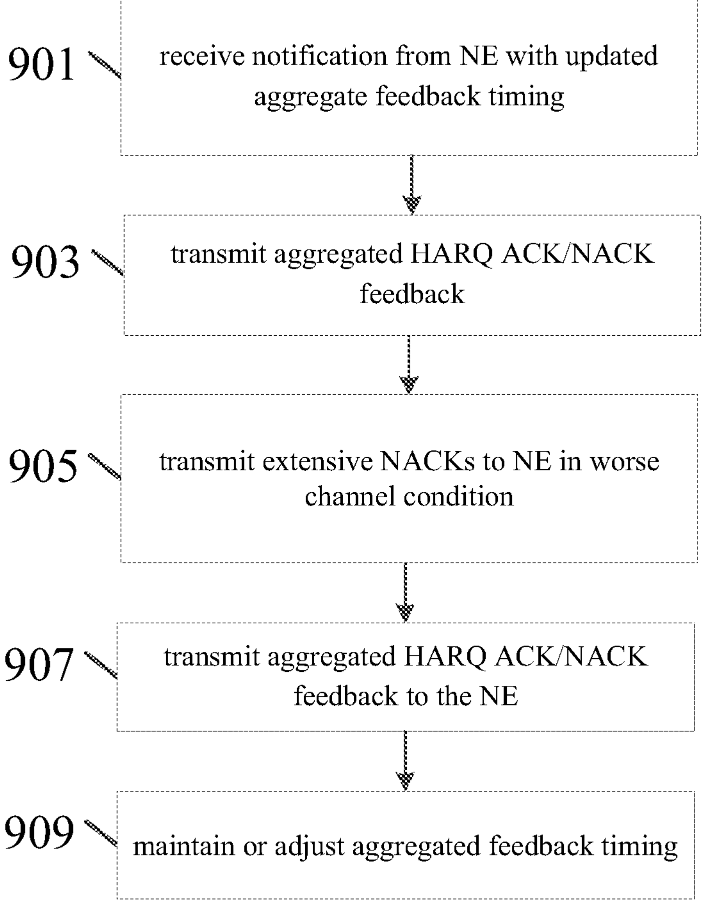
FIG. 9 illustrates another example of a flow diagram of a method according to an embodiment.

FIG. 9 illustrates an example of a flow diagram of a method that may be performed by a UE, such as UE 1320 illustrated in FIG. 13, according to certain embodiments. In particular, FIG. 9 describes dynamic adjustment of aggregated feedback timing when extensive NACKs are transmitted by UEs, which could compromise the delay budget requirement of the service. At 901, the UE may receive notification from at least one NE with updated aggregated feedback timing. The at least one NE may be similar to NE 1310 illustrated in FIG. 13. At 903, the UE may transmit aggregated HARQ ACK/NACK feedback to the at least one NE.

At 905, the UE may transmit at least one extensive NACK to the at least one NE in worse channel condition. In some embodiments, a "worse channel" UE may be a UE which generates extensive HARQ NACK that could potentially violate at least one QoS delay budget requirement of the service with heavy re-transmission. Thus, the NE may identify a worse channel UE based on an estimated number of violations of the at least one QoS delay budget requirement by re-transmission needed for extensive received NACKs from the UE. In various embodiments, HARQ NACK may be extensive when at least one threshold, such as at least one QoS delay budget requirement, is exceeded. For example, the NE may estimate the potential delay incurred on the service for re-transmission. If the estimated delay violates the threshold, the NE may compare estimates of PTP and PTM spectral efficiencies for the UE with the largest NACK feedback. In response, if PTP spectral efficiency is higher than PTM spectral efficiency, the NE may switch the UE to PTP. Alternatively, the NE may adjust the aggregate feedback timing to accommodate the QoS delay budget requirement. Meanwhile, at 907, the UE may transmit aggregated HARQ ACK/NACK feedback from the at least one NE, and at 909, the UE may maintain or adjust aggregated feedback timing from the at least one NE.

Some embodiments described herein may relate to a NE being notified over a common uplink channel of single or multiple transport block transmission failures to support HARQ retransmissions based on UEs using the substantially same group wake-up signals (WUS) to indicate to the NE a specific permutation of transport block (TB) errors. These signals may be based on short sequences similar to physical random access channel (PRACH), but potentially with certain characteristics optimised to improve or maximize constructive interference given a range of delays from different UEs. For one TB error, multiple UEs may use the substantially same reserved PRACH preamble to transmit at least one signal in the substantially same uplink time-frequency resource to indicate a NACK. Subsequently, depending on the NE accumulation of energy in that time-frequency PRACH resource, the NE may determine whether a retransmission is needed. In some embodiments, different reserved separate PRACH preambles and/or WUSs may indicate ACKs in order to avoid ACK/NACK misinterpretation on common channels for both ACK and NACK. For example, the WUSs Zadoff-Chu (ZC) sequence+gold cover code, where a ZC sequence may be used in LTE PRACH. This may allow a UE to select from a preconfigured subset of different PRACHs (or WUS-like signals) to indicate the substantially same NACK or ACK message (single or multiple TBs) in the substantially same UL time-frequency resource. This may also improve the likelihood of the energy detection for a given UL time-frequency resource by reducing the possibility of destructive interference between UEs sending substantially identical signals.

Different PRACH and/or WUS signals may be used to indicate different permutations of error transport blocks within a bundle of transport blocks for the NE to decide which TBs to retransmit. For example, for a bundle of 2 transport blocks, 4 different PRACHs may be used to indicate the 4 permutations of ACK and NACK: PRACH1 (ACK, NACK), PRACH2 (ACK, NACK), PRACH3 (NACK, ACK), and PRACH4 (NACK, NACK). In some embodiments, the ACKs may be assumed even if not signalled.

In some embodiments, when the NE detects an accumulated amount of energy in PRACHs 2 and 3 which exceed some network configurable threshold, the NE can choose to retransmit. For a bundle of 3 transport blocks, 8 different PRACHs may indicate the 8 permutations of ACK and NACK. Similarly, for a bundle of 'n' transport blocks, $2^n$ different PRACHs may indicate the $2^n$ permutations of ACK and NACK.

According to some embodiments, the NE may determine whether to retransmit using multicast or unicast using network configurable energy accumulation thresholds corresponding to one or at least one common signal, such as PRACH preamble signals. It may be more efficient not to retransmit and to allow, deliberately instruct, and/or preconfigure a subset of UEs to fallback to unicast to receive the (re) transmissions. In an example, errors frequently occurring on packets may be indicative of a problem with the outer loop link adaptation (OLLA), wherein it may be preferable to switch some UE to unicast. In another example, if the packet is still not received correctly after 2 re-transmissions, those UEs may be moved to unicast. In a further example, if the accumulated detected PRACH energy falls below a configured level, the network could assume the number of UEs using multicast may have dropped below the level where multicast broadcast is more efficient than unicast.

Certain embodiments may combine PRACH (or WUS-like) signals and conventional unicast style PUCCH to signal different levels of HARQ retransmissions. For example, if the number of individual errors within a TB bundle is larger than a configured threshold, the UE may be preconfigured to use a conventional UE-specific PUCCH response.

Furthermore, some embodiments may use different UE-specific, extra-narrow PRACHes (or WUS-like signal), such as LTE NB-IoT single tone PRACHes that are orthogonally positioned in the substantially same time-frequency resource. Here, UEs may be allocated multiple extra narrow PRACHes, which may be in different time-frequency resources. Within a specific time-frequency resource, the PRACHes sent by UEs may represent the substantially same ACK-NACK TB response, e.g. (NACK, NACK, ACK) for a 3 TB bundle. This extension may reduce the possibility of destructive combining, compared to techniques that assume the substantially same PRACH (or WUS-like signal) is used non-orthogonally in the substantially same time-frequency resource space by some or all UEs. Furthermore, the NE may have at least two methods of processing these incoming PRACHes: using energy detection across the time-frequency response, and detecting individual PRACHes that could be used to support UE specific HARQ-ACK responses. It is noted that this procedure may apply to UE in IDLE, INACTIVE, and CONNECTED modes, for example.

Figure 10:
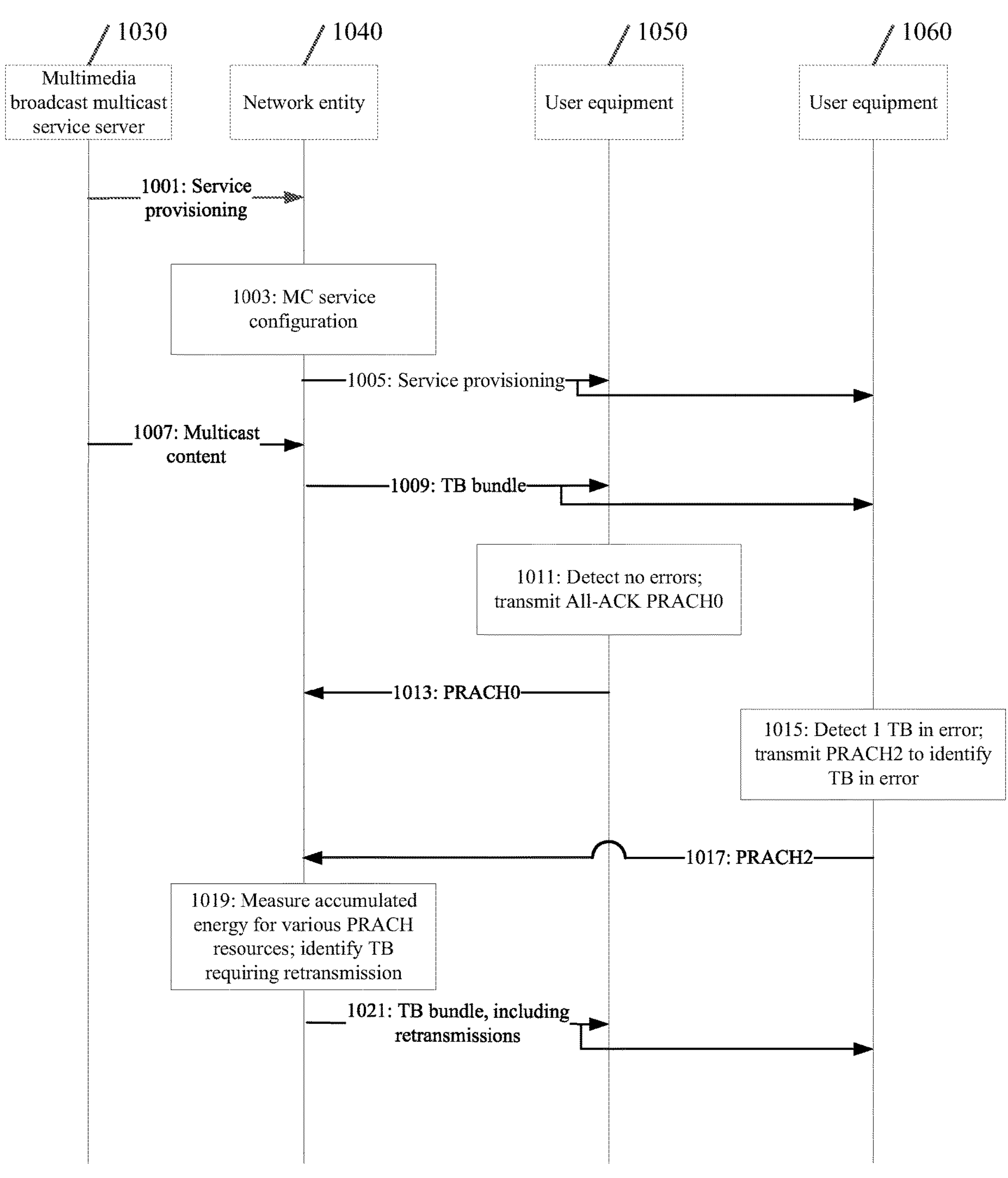
FIG. 10 illustrates an example of a signaling diagram for efficient HARQ feedback for multi-cast/broadcast users in NR, according to an embodiment.

FIG. 10 illustrates an example of a signaling diagram for efficient HARQ feedback for multi-cast/broadcast users in NR. Multimedia Broadcast Multicast Services (MBMS) server 1030 and NE 1040 may be similar to NE 1310, and UE 1050 and UE 1060 may be similar to UE 1320, as illustrated in FIG. 13, according to certain embodiments. As shown at 1001, MBMS server 1030 may transmit to NE 1040 at least one service provisioning, and at 1003, NE 1040 may determine at least one MC service configuration. At 1005, NE 1040 may transmit to a plurality of UE, such as UE 1050 and UE 1060, the at least one service provisioning. Meanwhile, at 1007, MBMS 1030 may begin transmitting to NE 1040 multicast content. Then at 1009, NE 1040 may transmit to the plurality of UE at least one transport block (TB) bundle.

Continuing, at 1011, UE 1050 may detect no errors in the received data. At 1013, UE 1050 may transmit to NE 1040 at least one PRACH0, and at 1015, UE 1060 may detect at least one TB in error. At 1017, UE 1060 may transmit to NE 1040 at least one PRACH2. At 1019, NE 1040 may measure accumulated energy for various PRACH resources. Additionally or alternatively, NE 1040 may identify at least one TB requiring retransmission to UE 1060, followed by 1021, wherein NE 1040 may transmit, via at least one multicast channel, at least one TB bundle comprising at least one TB requiring retransmission to the plurality of UE.

Figure 11:
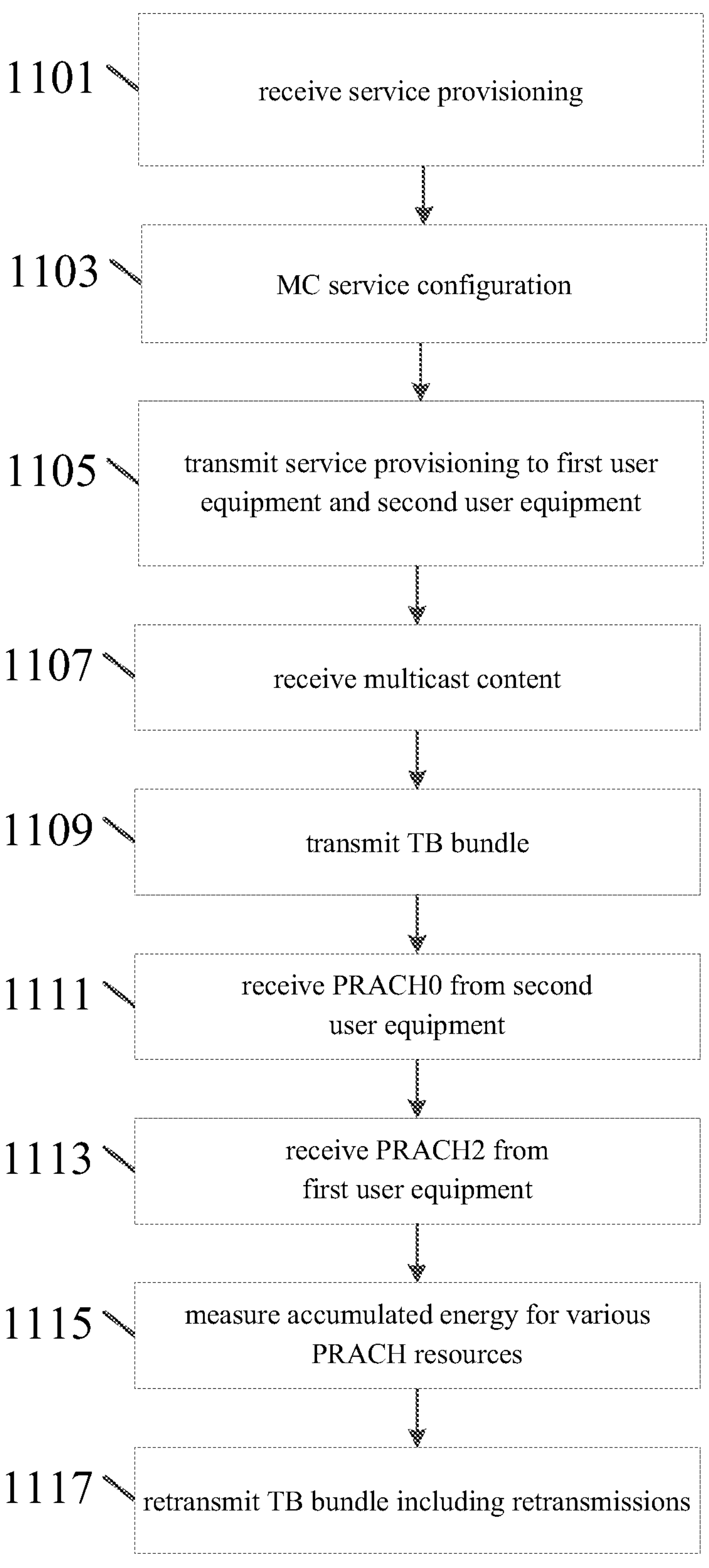
FIG. 11 illustrates an example of a flow diagram of a method according to some embodiments.

FIG. 11 illustrates an example of a flow diagram of a method that may be performed by a NE, such as NE 1310 illustrated in FIG. 13, according to certain embodiments. At 1101, the NE may receive service provisioning from a MBMS server, which may also be similar to NE 1310 in FIG. 13. At 1103, the NE may determine at least one MC service configuration, which may be either broadcast or setup per RRC. In some embodiments, the at least one MC service configuration may include bundle size and/or PRACH-to-error permutation mapping. At 1105, the NE may transmit service provisioning to a plurality of UE, such as UE 1050 and UE 1060, which may be similar to UE 1320 in FIG. 13, and at 1107, the NE may receive multicast content from the MBMS server. At 1109, the NE may transmit at least one TB bundle to the plurality of UE. At 1111, the NE may receive at least one PRACH0, from a second UE, and at 1113, the NE may receive at least one PRACH2 from the first UE. At 1115, the NE may measure accumulated energy for a plurality of PRACH resources, and finally, at 1117, the NE may transmit, via at least one multicast channel, at least one TB bundle comprising at least one TB requiring retransmission to the plurality of UE.

Figure 12:
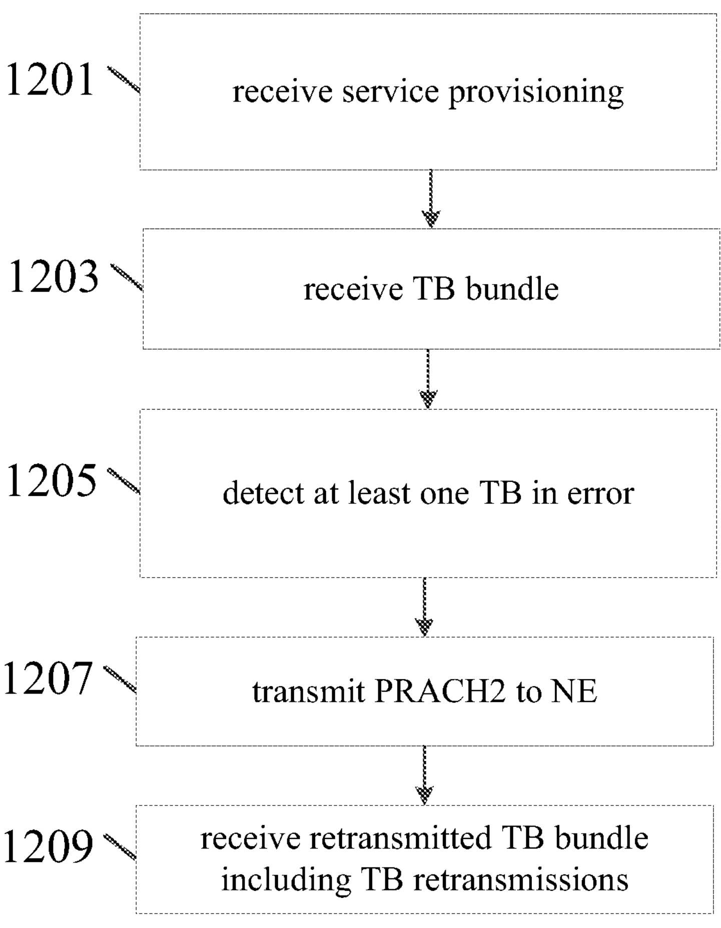
FIG. 12 illustrates an example of a flow diagram of a method according to some embodiments.

FIG. 12 illustrates an example of a flow diagram of a method that may be performed by a UE, such as UE 1320 illustrated in FIG. 13, according to certain embodiments. At 1201, the UE may receive at least one service provisioning from an NE, which may be similar to NE 1310 illustrated in FIG. 13, according to certain embodiments. At 1203, the UE may receive at least one TB bundle from the NE. At 1205, the UE may detect at least one TB in error. At 1207, the UE may transmit at least one PRACH2 to the NE. At 1209, the UE may receive at least one retransmitted TB bundle.

FIG. 13 illustrates an example of a system according to certain example embodiments. In one example embodiment, a system may include multiple devices, such as, for example, NE 1310 and UE 1320.

Network entity 1310 may be one or more of a base station, such as an evolved node B (eNB) or 5G or New Radio node B (gNB), a serving gateway, a server, and/or any other access node or combination thereof. Furthermore, network entity 1310 and/or user equipment 1320 may be one or more of a citizen's broadband radio service device (CBSD).

Network entity 1310 may further comprise at least one gNB-CU, which may be associated with at least one gNB-DU. The at least one gNB-CU and at least one gNB-DU may be in communication via at least one F1 interface, at least one $X_n$-C interface, and/or at least one NG interface via a 5GC.

User equipment 1320 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

One or more of these devices may include at least one processor, respectively indicated as 1311 and 1312. Processors 1311 and 1312 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of devices indicated at 1312 and 1322. The memory may be fixed or removable. The memory may include computer program instructions or computer code contained therein. Memories 1312 and 1322 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

Processors 1311 and 1321 and memories 1312 and 1322 or a subset thereof, may be configured to provide means corresponding to the various blocks of FIGS. 1-12. Although not shown, the devices may also include positioning hardware, such as GPS or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 13, transceivers 1313 and 1323 may be provided, and one or more devices may also include at least one antenna, respectively illustrated as 1314 and 1324. The device may have many antennas, such as an array of antennas configured for multiple input multiple output (MIMO) communications, or multiple antennas for multiple radio access technologies. Other configurations of these devices, for example, may be provided. Transceivers 1313 and 1323 may be a transmitter, a receiver, or both a transmitter and a receiver, or a unit or device that may be configured both for transmission and reception.

The memory and the computer program instructions may be configured, with the processor for the particular device, to cause a hardware apparatus such as user equipment to perform any of the processes described below (see, for example, FIGS. 1-12). Therefore, in certain embodiments, a non-transitory computer-readable medium may be encoded with computer instructions that, when executed in hardware, perform a process such as one of the processes described herein. Alternatively, certain embodiments may be performed entirely in hardware In certain embodiments, an apparatus may include circuitry configured to perform any of the processes or functions illustrated in FIGS. 1-12. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor (s) or a portion of a microprocessor(s), that include software, such as firmware for operation. Software in circuitry may not be present when it is not needed for the operation of the hardware.

Figure 14:
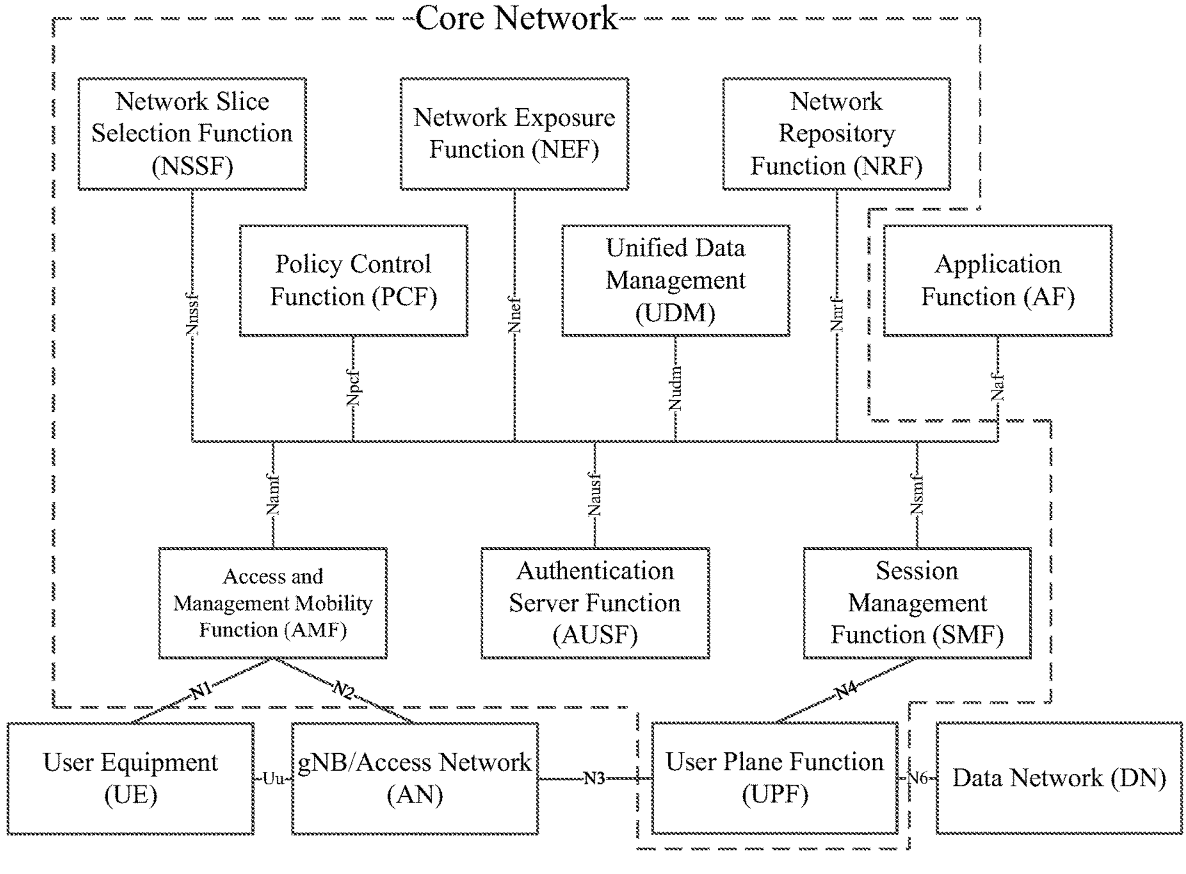
FIG. 14 illustrates an example of a 5G network and system architecture according to certain embodiments.

FIG. 14 illustrates an example of a 5G network and system architecture according to certain embodiments. Shown are multiple network functions that may be implemented as software operating as part of a network device or dedicated hardware, as a network device itself or dedicated hardware, or as a virtual function operating as a network device or dedicated hardware. The NE and UE illustrated in FIG. 12 may be similar to NE 1310 and UE 1320, respectively. A UPF may provide services such as intra-RAT and inter-RAT mobility, routing and forwarding of data packets, inspection of packets, user plane QoS processing, buffering of downlink packets, and/or triggering of downlink data notifications. An AF may primarily interface with the core network to facilitate application usage of traffic routing and interact with the policy framework.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

Partial Glossary

3GPP Third Generation Partnership Project
5G Fifth Generation
5GC Fifth Generation Core 5GS Fifth Generation System
5QI Fifth Generation Quality of Service Indicator
ACK Acknowledgement
AMF Access and Mobility Management Function
ARQ Automatic Repeat Request
ASIC Application Specific Integrated Circuit
BS Base Station
CN Core Network
CRC Cyclic Redundancy Check
CPU Central Processing Unit
CU Central Unit
DAI Downlink Assignment Index
DCI Downlink Control Information
DL Downlink
DMRS Demodulation Reference Signal
DU Distributed Unit
eMBB Enhanced Mobile Broadband
eMTC Enhanced Machine Type Communication
eNB Evolved Node B
eOLLA Enhanced Outer Loop Link Adaptation
EPS Evolved Packet System
FR Frequency Range
gNB Next Generation Node B
GPS Global Positioning System
HARQ Hybrid Automatic Repeat Request
HARQ PID Hybrid Automatic Repeat Request Process Identifier
HDD Hard Disk Drive
IEEE Institute of Electrical and Electronics Engineers
IMSI International Mobile Subscriber Identity
IoT Internet of Things
IPTV Internet Protocol Television
L1 Layer 1
L2 Layer 2
LTE Long-Term Evolution
MAC Medium Access Control
MBS Multicast and Broadcast Systems
MC Multicast
MCS Modulation and Coding Scheme
MEMS Micro Electrical Mechanical System
MIB Master Information Block
MIMO Multiple Input Multiple Output
MME Mobility Management Entity
MPDCCH Machine Type Communication Physical Downlink Control Channel
MTC Machine Type Communication
NACK Negative Acknowledgement
NAS Non-Access Stratum
NB-IoT Narrowband Internet of Things
NE Network Entity
NG Next Generation
NR New Radio
NR-U New Radio Unlicensed
OLLA Outer Loop Link Adaptation
PDA Personal Digital Assistance
PDCCH Physical Downlink Control Channel
PDSCH Physical Downlink Shared Channel
PDU Protocol Data Unit
PHY Physical
PO Paging Occasion
PRACH Physical Random Access Channel
PRB Physical Resource Block
P-RNTI Paging Radio Network Temporary Identifier
PTM Point-to-Multipoint
PTP Point-to-Point
PUCCH Physical Uplink Control Channel
PUSCH Physical Uplink Shared Channel
QFI Quality of Service Flow Identifier
QoS Quality of Service
RAM Random Access Memory
RAN Radio Access Network
RE Resource Element
RLC Radio Link Control
RNTI Radio Network Temporary Identifier
RRC Radio Resource Control
RS Reference Signal
RSRP Reference Signal Received Power
SC-PTM Single Cell-Point-to-Multipoint
SDU Service Data Unit
SFN System Frame Number
SIB System Information Block
SFN Single Frequency Network
SMF Session Management Function
SR Scheduling Report
SRB Signaling Radio Bearer
SSB Synchronization Signal Block
TB Transport Block
TDD Time Division Duplex
TR Technical Report
TS Technical Specification
TTI Transmission Time Interval
Tx Transmission
UCI Uplink Control Information
UE User Equipment
UL Uplink
UPF User Plane Function
URLLC Ultra-Reliable and Low-Latency Communication
WLAN Wireless Local Area Network
WUS Wake-Up Signal
ZC Zadoff-Chu

We claim:

1. An apparatus, comprising:
at least one processor; and
at least one memory including computer program code;
the at least one memory and the computer program code configured to, with the at least one processor, cause the apparatus at least to:
receive aggregated feedback configured for point-to-multipoint from a plurality of user equipment, wherein the aggregated feedback includes at least one extensive negative acknowledgement from one user equipment of the plurality of user equipment in a worse channel condition, wherein the worse channel condition corresponds to a user equipment that produces Hybrid Automatic Repeat reQuests-Negative Acknowledgements (HARQ NACKs) for which an estimated retransmission delay is determined to cause a greatest number of violations of a quality-of-service (QoS) delay budget requirement of the service;
identify the one user equipment of the plurality of user equipment with the worse channel condition;
determine that point-to-point efficiency is greater than point-to-multipoint efficiency for the one user equipment; and
switch the one user equipment from point-to-multipoint to point-to-point when the point-to-point efficiency is greater than the point-to-multipoint efficiency.

2. The apparatus of claim 1, further comprising:
transmit at least one reconfiguration message to the one user equipment.

3. An apparatus, comprising:
at least one processor; and at least one memory including computer program code;
the at least one memory and the computer program code configured to, with the at least one processor, cause the apparatus at least to:
determine at least one aggregated feedback timing for at least one single cell point-to-multipoint bearer;
transmit at least one notification to a plurality of user equipment with the determined at least one aggregated feedback timing;
receive aggregated feedback comprising at least one of hybrid automatic repeat request acknowledgement or negative acknowledgement from the plurality of user equipment receiving the at least one single cell point-to-multipoint bearer;
receive at least one negative acknowledgement that is an extensive negative acknowledgement in the aggregated feedback from one user equipment of the plurality of user equipment in a worse channel condition, wherein the worse channel condition corresponds to a user equipment that produces Hybrid Automatic Repeat reQuests-Negative Acknowledgements (HARQ NACKs) for which an estimated retransmission delay is determined to cause a greatest number of violations of a quality-of-service (QoS) delay budget requirement of the service;
identify the one user equipment in the worse channel condition; and
adjust the at least one aggregated feedback timing based on the quality of service delay budget requirement of the service.

4. An apparatus, comprising:
at least one processor; and
at least one memory including computer program code;
the at least one memory and the computer program code configured to, with the at least one processor, cause the apparatus at least to:
receive at least one notification from at least one network entity with aggregate feedback timing;
transmit at least one aggregated feedback comprising at least one of hybrid automatic repeat request acknowledgement or negative acknowledgement feedback;
transmit at least one extensive negative acknowledgement in the aggregated feedback to the at least one network entity from one user equipment of a plurality of user equipment in a worse channel condition, wherein the worse channel condition corresponds to a user equipment that produces Hybrid Automatic Repeat reQuests-Negative Acknowledgements (HARQ NACKs) for which an estimated retransmission delay is determined to cause a greatest number of violations of a quality-of-service (QoS) delay budget requirement of the service; and
adjust at least one aggregated feedback timing based on the quality of service delay budget requirement of the service.

5. The apparatus of claim 4, wherein the at least one notification is in response to determination, by the at least one network entity, determining that point-to-point spectral efficiency is higher than point-to-multipoint spectral efficiency.

6. The apparatus of claim 5, further comprising: wherein the at least one processor, further causes the apparatus at least to switch from point-to-multipoint to point-to-point in response to the at least one notification.

7. A method, comprising:
receiving, by a network entity, aggregated feedback configured for point-to-multipoint from a plurality of user equipment, wherein the aggregated feedback includes at least one extensive negative acknowledgement from one user equipment of the plurality of user equipment in a worse channel condition, wherein the worse channel condition corresponds to a user equipment that produces Hybrid Automatic Repeat reQuests-Negative Acknowledgements (HARQ NACKs) for which an estimated retransmission delay is determined to cause a greatest number of violations of a quality-of-service (QoS) delay budget requirement of the service;
identifying, by the network entity, the one user equipment;
determining, by the network entity, that point-to-point efficiency is greater than point-to-multipoint efficiency for the one user equipment; and
switching, by the network entity, the one user equipment from point-to-multipoint to point-to-point when the point-to-point efficiency is greater than the point-to-multipoint efficiency.

8. The method of claim 7, further comprising:
transmitting, by the network entity, at least one reconfiguration message to the one user equipment.

9. A method, comprising:
determining, by a network entity, at least one aggregated feedback timing for at least one single cell point-to-multipoint bearer;
transmitting, by the network entity, at least one notification to a plurality of user equipment with the determined at least one aggregated feedback timing;
receiving, by the network entity, aggregated feedback comprising at least one of hybrid automatic repeat request acknowledgement or negative acknowledgement from the plurality of user equipment receiving the at least one single cell point-to-multipoint bearer;
receiving at least one extensive negative acknowledgement in the aggregated feedback from one user equipment of the plurality of user equipment in a worse channel condition, wherein the worse channel condition corresponds to a user equipment that produces Hybrid Automatic Repeat reQuests-Negative Acknowledgements (HARQ NACKs) for which an estimated retransmission delay is determined to cause a greatest number of violations of a quality-of-service (QoS) delay budget requirement of the service;
identifying the one user equipment in the worse channel condition; and
adjusting the at least one aggregated feedback timing based on the quality of service delay budget requirement of the service.

10. The method of claim 9, further comprising:
determining, by the network entity, the aggregate feedback timing based on: quality of service requirement, delay budget, the received hybrid automatic repeat request acknowledgement or negative acknowledgement, capacity of feedback channel, and scheduling of the at least one single cell point-to-multipoint bearer.

* * * * *